(12) United States Patent
Davies et al.

(10) Patent No.: US 6,835,365 B1
(45) Date of Patent: *Dec. 28, 2004

(54) CRYSTAL GROWTH

(75) Inventors: Geoffrey John Davies, Randburg (ZA); Raymond Albert Chapman, Johannesburg (ZA); Aulette Stewart, Randburg (ZA); Lesley Kay Hedges, Brackenhurst (ZA)

(73) Assignee: Moosa Mahomed Adia, Benoni (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 09/555,518

(22) PCT Filed: Dec. 10, 1998

(86) PCT No.: PCT/GB98/03695

§ 371 (c)(1),
(2), (4) Date: Aug. 23, 2000

(87) PCT Pub. No.: WO99/29411

PCT Pub. Date: Jun. 17, 1999

(30) Foreign Application Priority Data

Dec. 11, 1997 (ZA) .......................... 97/11149

(51) Int. Cl.⁷ .................. C01B 31/06; C30B 11/00; C30B 17/00
(52) U.S. Cl. .................. 423/446; 117/79
(58) Field of Search .................. 423/446; 117/49

(56) References Cited

U.S. PATENT DOCUMENTS

| | | | | |
|---|---|---|---|---|
| 3,890,430 A | * | 6/1975 | Bakul et al. | 423/446 |
| 4,551,316 A | * | 11/1985 | Iizuka | 423/290 |
| 5,151,107 A | * | 9/1992 | Cho et al. | 51/295 |
| 5,443,032 A | * | 8/1995 | Vichr et al. | 117/84 |
| 5,523,121 A | * | 6/1996 | Anthony et al. | 427/249 |
| 5,814,149 A | * | 9/1998 | Shintani et al. | 117/104 |
| 6,080,378 A | * | 6/2000 | Yokota et al. | 423/446 |
| 6,270,548 B1 | * | 8/2001 | Campbell et al. | 75/243 |
| 6,576,211 B1 | * | 6/2003 | Davies et al. | 423/446 |

FOREIGN PATENT DOCUMENTS

EP 0079117 * 5/1983 .......... C01B/31/06

OTHER PUBLICATIONS

Hongchang Yu et al. "Sintering of Ultrafine Diamond Particles Under High Temperature and High Pressure", Diamond and Related Materials, vol. 3, No. 3 Feb. 1, 1994, pp. 222–226.*

Shi Ming Hong et al. "Diamond Formation from a System of SiC and a Metal", Diamond and Related Materials., vol. 2, 1993, pp. 508–511.*

Jae–Kap Lee et al. "Effect of the Buoyancy Force on Diamond Formation During Synthesis Under a High Pressure", vol. 2, Mar. 31, 1993, pp. 496–499.*

A.V. Andreyev et al. "Diamond Formation and Wettability in a Mg–Cu–C System Under High Pressure and High Temperature", vol. 6, No. 1, Jan. 1997, pp. 28–32.*

* cited by examiner

*Primary Examiner*—Stanley S. Silverman
*Assistant Examiner*—Jonas N. Strickland
(74) *Attorney, Agent, or Firm*—Oblon, Spivak, McClelland, Maier & Neustadt, P.C.

(57) ABSTRACT

The invention provides a mass of crystals, particularly diamond crystals, having a size of less than 100 microns and in which mass the majority of the crystals are faceted single crystals. The invention further provides a method of producing such a mass of crystals which utilizes crystal growth under elevated temperature and pressure conditions, the supersaturation driving force necessary for crystal growth being dependent, at least in part, on the difference in surface free energy between low Miller index surfaces and high Miller index surfaces of the crystals. Preferably, the method is carried out under conditions where the Wulff effect dominates.

5 Claims, 4 Drawing Sheets

CRYSTAL GROWTH

BACKGROUND OF THE INVENTION

This invention relates to the growth of crystals under conditions of high temperature and high pressure.

The synthesis of crystals at high temperature and high pressures, particularly diamond and cubic boron nitride, is very well established commercially. There are two principle methods employed, both form solution, namely a temperature gradient method and an allotropic change method. In the temperature gradient method, the driving force for crystal growth is the supersaturation due to the difference in solubilities of the source material and the growing crystal as the result of a temperature difference between the two. In the allotropic change method, the driving force for crystal growth is the supersaturation due to the difference in solubilities of the source material and the growing crystal as the result of an allotropic (or polymorphic) difference between the two.

SUMMARY OF THE INVENTION

The present invention provides a mass of diamond crystals, which have a size of less than 100 microns and in which mass the majority of the crystals, and preferably at least 80 percent of the mass, are macroscopically faceted single crystals. Some of the crystals may be twinned.

A mass of diamond crystals, which are predominantly macroscopically faceted single crystals may be produced by a method which includes the steps of providing a source of diamond crystals and which are substantially free of macroscopically faceted surfaces, producing a reaction mass by bringing the source diamond crystals into contact with a suitable solvent catalyst, subjecting the reaction mass to conditions of elevated temperature and pressure suitable for crystal growth in the reaction zone of a high temperature high pressure apparatus, removing the reaction mass from the reaction zone and recovering the crystals from the reaction mass, the conditions of crystal growth being chosen such that the source diamond crystals are converted to diamond crystals having developed macroscopic facets of low Miller index. The mass of crystals will generally contain at least 80% of macroscopically faceted single crystals.

The method of generating the supersaturation driving force necessary for crystal growth used in the practice of this invention depends, at least in part, and preferably predominantly, upon the difference in surface free energy between low Miller index surfaces and higher Miller index surfaces, hereinafter referred to as "the Wulff effect"; higher Miller index surfaces having a higher surface free energy than lower Miller index surfaces. The equilibrium shape of a crystal occurs when the minimum total surface free energy per unit volume of crystal is attained, i.e. when the crystal is bounded by surfaces of low Miller index. Higher Miller index surfaces can be considered to comprise a series of stepped low Miller index surfaces in close proximity to one another. Such a situation is included in the term "higher Miller index surface". When a crystal is in its equilibrium shape, there exists a point whose perpendicular distance from every face is proportional to the surface free energy of that face. This is the basis of Wulff's theorem.

It has been found that in the case of diamond, the difference in surface-free energy between high Miller index surfaces and low Miller index surfaces is large and can generate a supersaturation which sustains crystallisation when diamond crystals in various sires, including those tens of microns in size, are used. Thus, the invention has particular application to the growth of diamond crystals wherein supersaturation is created, at least in part, and preferably predominantly, by a difference in solubility of crystal surfaces of high Miller index and crystal surfaces of lower Miller index, e.g. by the reduction of surface-free energy by the substantial elimination of steps, kinks and other structural defects which characterise macroscopic high Miller index surfaces.

It has further been observed that the Wulff effect is dependent on the conditions which prevail in the reaction mass. For example, for a given solvent/catalyst and pressure applied, the Wulff effect is dependent on temperature and time, as can be seen from the graphs shown in FIGS. 1 and 2. The graph of FIG. 1 shows the temperature dependence of the Wulff effect on diamond in an iron-nickel solvent/catalyst at about 5.4 GPa, with this condition being maintained for one hour. The graph of FIG. 2 shows the temperature dependency of the Wulff effect on diamond in the same iron-nickel solvent/catalyst at about 5.4 GPa with the condition being maintained for ten hours. From these graphs, it will be noted that the larger the source crystal size the higher the applied temperature to ensure that the Wulff effect dominates and the production of a crystal mass containing a high proportion of single crystal having facets of low Miller index is achieved. Similar graphs can be produced for other solvent/catalysts and applied pressures to determine under what conditions the Wulff effect dominates.

Particles with a high portion of high Miller index surfaces will yield faceted diamond crystals more readily than particles with a low proportion of high Miller index faces. Further, particles with a low proportion of high Miller index surfaces may only facet partially and/or show dissolution facets.

The conditions of elevated temperature and pressure for crystal growth will vary according to the nature of the crystal. For diamond crystals, the elevated temperature will generally be in the range 1100 to 1500° C. and the elevated pressure generally in the range 4.5 to 7 GPa.

The diamond crystals, may be recovered from the reaction mass using methods known in the art. For example, the most practical method is simply to dissolve away the solvent/catalyst leaving the mass of crystals. If some of the crystals are loosely bound to other crystals, they can be released by light milling or other similar action.

The method described above will primarily be used to produce a mass of crystals which has a size of less than 100 microns. However, the method may also be used for producing a mass of macroscopically faceted crystals of larger size and this also forms part of the invention.

The source diamond crystals may be provided by particles of irregular shape and substantially free of macroscopically facetted surfaces. An example of suitable source crystals is the product of a crushing operation. By way of example, FIG. 4 shows a photograph at 260× magnification of angular source diamond crystals. The source particles may also be provided by particles which have been treated so that macroscopic facets are damaged or destroyed, and/or surfaces of high Miller index are created, and higher surface energy faces formed thereby.

The source diamond crystals may have a narrow size distribution or a relatively wide size distribution. Provided the conditions are chosen such that the Wulff effect dominates in the crystal growth, then the mass of faceted single crystals produced will have essentially the same size distribution as that of the source crystals.

Supersaturation can also be assisted by the differences in solubility between strained and less strained (or strain-free) crystals.

The mass of faceted diamond crystals has application in polishing, lapping, and grinding, allows for easier and more accurate size separation and determination, and has better flow characteristics in dry powder and slurry forms. The faceted diamond crystals also have application in the manufacture of polycrystalline products.

DESCRIPTION OF THE EMBODIMENTS

Figure 1:
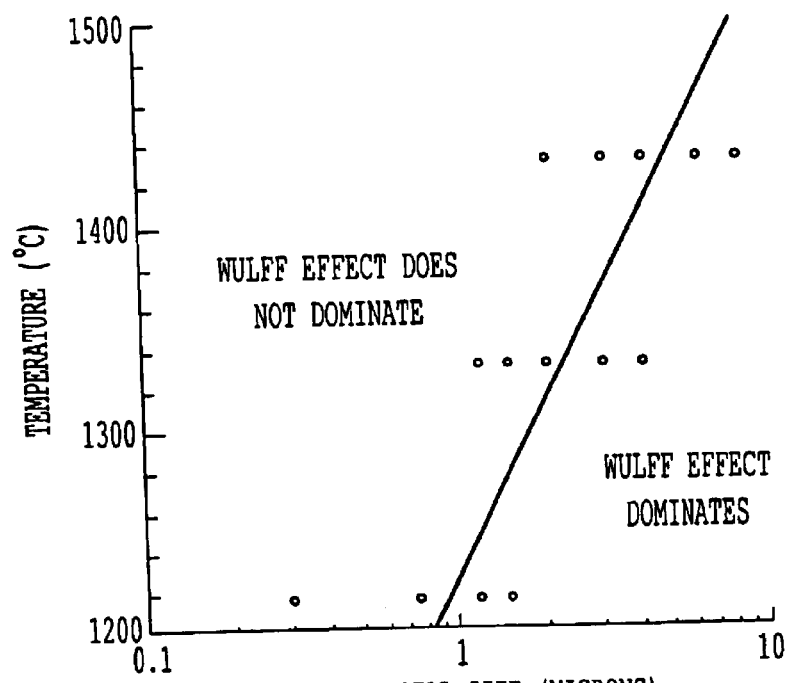
FIG. 1 is a graph showing the temperature dependence of the Wulff effect on diamond in an iron-nickel solvent/catalyst at about 5.4 GPa with the condition being maintained for one hour.
Figure 2:
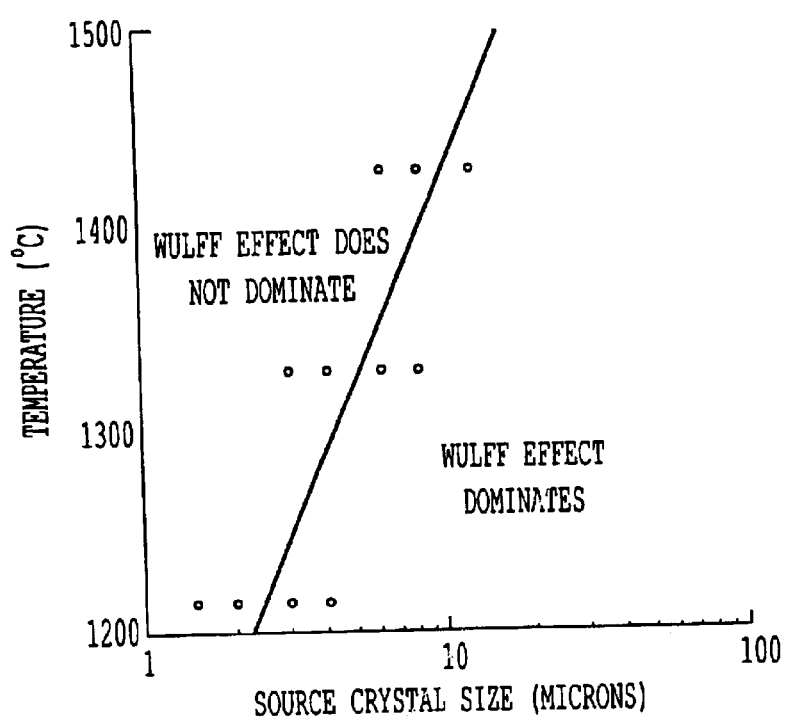
FIG. 2 is a graph showing the temperature dependence of the Wulff effect on diamond in an iron-nickel solvent/catalyst at about 5.4 GPa with the condition being maintained for 10 hours.

The invention has application to the growth or synthesis of diamond crystals which utilise high temperature and high pressure conditions.

The size of the source crystals, will vary according to the nature of the crystal being grown.

The source crystals may also be provided by particles comprising a core of diamond and a coating of a suitable material such as a layer of a solvent/catalyst, provided, of course, that the diamond particle of the core has high Miller index surfaces and is substantially free of macroscopic facets.

The source crystals can also be provided by a particle comprising a core of any material having a cladding or coating of the crystal to be grown.

The solvent/catalyst which is used will depend on the nature of the crystal being grown. Examples of such solvent/catalysts in the case of diamond are transition metal elements such as iron, cobalt, nickel, manganese and alloys containing any one of these metals, stainless steels, superalloys (e.g. cobalt, nickel and iron-based), silicon steels, bronzes and brazes such as nickel/phosphorus, nickel/chromium/phosphorus and nickel/palladium. Other suitable solvent/catalysts for diamond synthesis are elements, compounds and alloys not containing transition metals. e.g. copper, copper/aluminium and phosphorus, and non-metallic materials or a mixture thereof such as alkaline, alkaline earth metal hydroxides, carbonates and sulphates, chlorates and silicates (such as hydrated forms of forsterite and enstatite).

In the case of diamond, the source particles may be synthetic diamond made by conventional high pressure/high temperature processes or other suitable technique, or natural diamond.

In the case of diamond growth, be synthesis conditions may be those under which the crystal is thermodynamically stable. These conditions are well known in the art. However, it is also possible to produce diamond growth under conditions which are outside the region of thermodynamic stability of diamond. Conditions of temperature and pressure outside the region of thermodynamic stability of diamond can be used if the Ostwald rule dominates the growth process rather than the Ostwald-Volmer rule (see Bohr, R. Haubner and B. Lux Diamond and Related Materials volume 4, pages 714–719, 1995)—"According to the Ostwald rule, if energy is withdrawn from a system with several energy states, the system will not reach the stable ground state directly, but instead will gradually pass through all intermediate states. In addition, according to the Ostwald-Volmer rule, the less dense phase is formed (nucleated) first. Where the two rules would appear to contradict each other, the Ostwald-Volmer rule has priority over the Ostwald rule."

In the case of diamond crystal growth outside its region of thermodynamic stability, the Ostwald-Volmer rule can be suppressed by, for example, the application of pressure, thus allowing the growth of diamond on preexisting diamond particles, provided graphite crystals are substantially absent. Although isothermal and isobaric conditions are not essential to the practice of this invention, such conditions are preferred.

The source crystals are brought into contact with a suitable solvent/catalyst to create a reaction mass. Generally, the source crystals will be mixed with the catalyst/solvent in particulate form.

The reaction mass may be placed in the reaction zone of a conventional high temperature/high pressure apparatus and the contents then subjected to the elevated conditions of temperature and pressure necessary for achieving the crystal growth. The higher Miller index surfaces dissolve in the catalyst/solvent preferentially with respect to the lower Miller index surfaces. The solute migrates to the lower Miller index surface and precipitates or grows thereon. The crystals which are produced will have a morphology which is dependent on the saturation-time profile utilised. The temperature and pressure conditions and chemical composition of the solvent/catalyst also influence morphology.

Crystallisation and crystal structure modifiers such as nitrogen, boron or phosphorus may be introduced into the reaction mass to achieve specific objectives.

The invention will be illustrated by the following non-limiting examples.

EXAMPLE 1

A reaction capsule described above was used to produce a plurality of faceted diamond crystals, together with some twinned crystals. A mixture was made of (a) 50 g diamond particles with a particle size distribution of from 20 to 40 microns and produce by crushing coarser synthetic material, and (b) 285 g iron-cobalt powder. The diamond particles were free of macroscopic facets. The mixture as placed in the reaction capsule and raised to conditions of about 5.5 GPa and about 1420° C. These conditions were maintained for a period of 11 hours. The resultant crystals were almost entirely faceted and in some cases twinned. The total mass of crystals recovered was 41 g and these were substantially in the size range from 30 to 50 microns. At least 8 percent by mass of the particles were single crystal.

Figure 4:
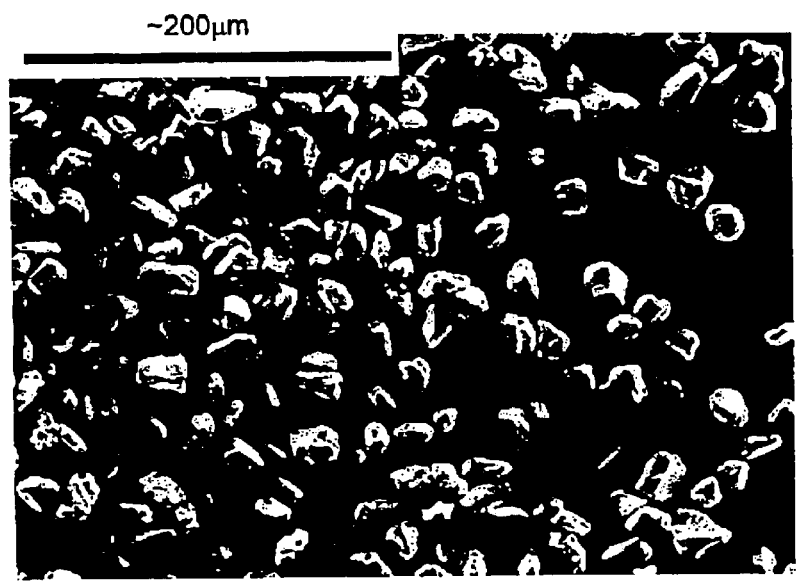
FIG. 4 is a photograph at 260× magnification of angular source diamond crystals.
Figure 5:
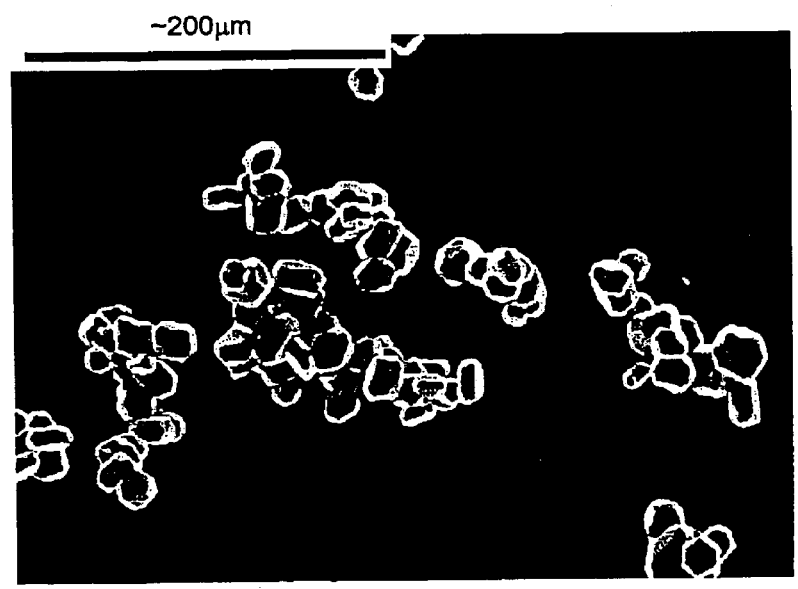
FIG. 5 is a photograph of faceted and some twinned diamond crystals at 260× magnification produced by the method of the invention.
Figure 6:
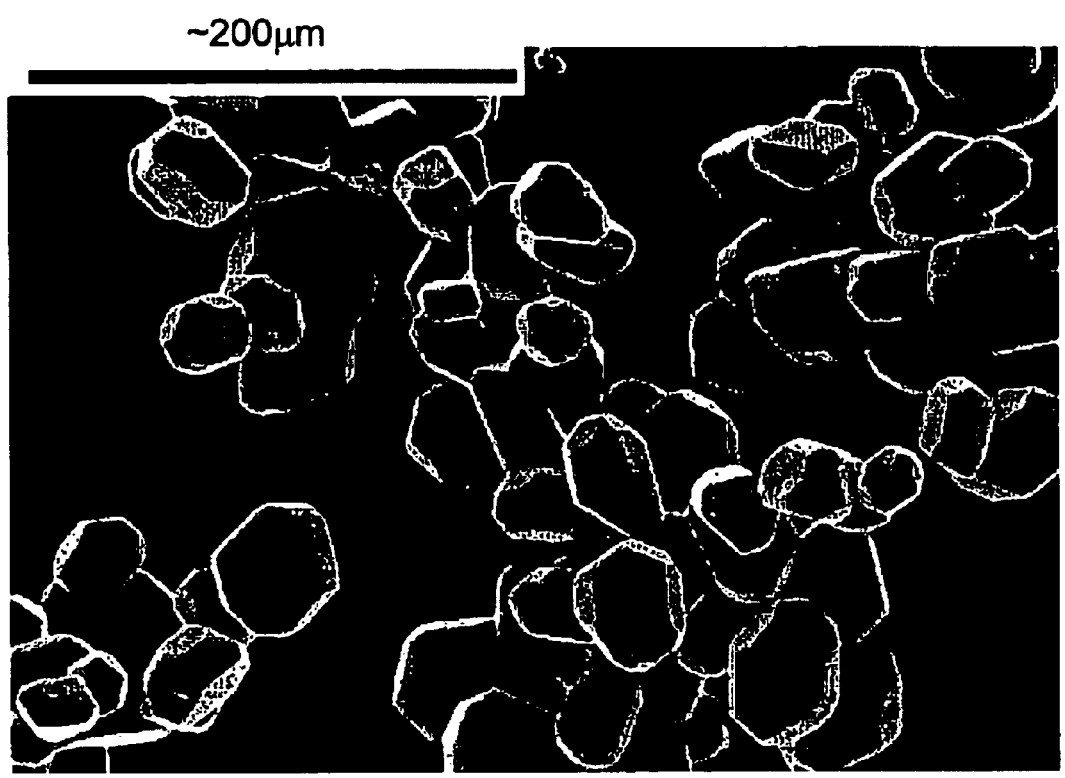
FIG. 6 is a photograph of the crystals of FIG. 3 at 520× magnification.

FIG. 4 is a photograph at 260× magnification of the source diamond particles (crystals) showing the angular (but not faceted) nature of the particles. FIGS. 5 and 6 are photographs at different magnifications of the faceted and in some cases twinned diamond crystals produced by the method. The facets can clearly be seen on the photographs. It will be noted that the faceted and twinned crystals formed loosely bound agglomerates. The individual particles can be liberated by subjecting the agglomerates to light milling or similar action.

EXAMPLE 2

A reaction capsule described above was again used to produce a plurality of faceted diamond crystals. A mixture was made of (a) 50 g diamond particles, with a maximum size of 8 microns and minimum size of 4 microns, produced by crushing coarser synthetic material, and (b) 284.6 g cobalt-iron solvent. The diamond articles were free of macroscopic facets. The mixture was placed in the reaction capsule and raised to conditions of about 5.5 GPa and about 1370° C. These conditions were maintained for a period of 11 hours. The grown crystals were entirely faceted and in some cases twinned, and ranged in size from about 6 microns to about 10 microns. A total mass of 39.5 g of crystals was recovered. At least 80 percent by mass of the particles were single crystal.

EXAMPLE 3

A reaction capsule described above was used again to produce a plurality of faceted diamond crystals. A mixture was made of 30 percent by volume diamond particles with a particle size distribution of from 20 to 40 microns and produced by crushing coarser synthetic material, and (b) 70 percent by volume iron-nickel powder. The diamond particles were free of macroscopic facets. The mixture was placed in the reaction capsule and raised to conditions of about 5.5 Pa and about 1400° C. These conditions were maintained for a period of 20 minutes. The resultant crystals were entirely faceted and in some case twinned, with their sizes in the range from 25 to 45 microns. At least 80 percent by mass of the particles were single crystal.

EXAMPLE 4

A reaction capsule described above as again used to produce a plurality of faceted diamond crystals. A mixture was made of (a) 30 percent by volume natural diamond particles of irregular shape and with a particle size distribution from 20 to 40 microns and (b) 70 percent by volume cobalt-iron powder. The diamond particles were free of macroscopic facets. The mixture was placed in the reaction capsule and raised to a condition of about 5.5 GPa and about 1370° C., and the conditions maintained for a period of 1 hour. The recovered crystals were found to be entirely faceted, and in some cases twinned. The size of these crystals were in the range from 25 to 50 microns. At least 80 percent by mass of the particles were single crystals.

In examples 2, 3 and 4, the source and faceted and twinned diamond crystals were similar to those illustrated by FIG. 4 and FIGS. 5 and 6, respectively.

EXAMPLES 5 to 25

Faceted diamond crystals were produced using solvent/catalysts other than those identified in Examples 1 to 4. These examples of other solvent/catalyst systems, and the conditions at which they were used, are set out in Table I hereinafter. In each of Examples 5 to 25, the source diamond particles were crushed synthetic diamond particles of irregular shape and free of macroscopic facets.

TABLE I

| Example | Solvent/catalyst or matrix (nominal composition) | Pressure (GPa) | Temperature (° C.) | Time (mins) |
| --- | --- | --- | --- | --- |
| 5 | 100 Fe | 5.25 | 1390 | 660 |
| 6 | 100 Co | 5.25 | 1390 | 660 |
| 7 | 100 Ni | 5.48 | 1410 | 660 |
| 8 | 100 Cu | 5.35 | 1400 | 660 |
| 9 | 100 Mn | 5.35 | 1400 | 660 |
| 10 | 89 Ni.11 P | 5.42 | 1250 | 660 |
| 11 | 52 Mn.48 Ni | 5.25 | 1360 | 40 |
| 12 | 80 Cu.20 Ni | 5.3 | 1400 | 300 |
| 13 | 60 Cu.40 Sn | 5.35 | 1400 | 660 |
| 14 | 60 Co.24 Cu.16 Sn | 5.3 | 1400 | 300 |
| 15 | 42 Cu.30 Co.28 Sn | 5.3 | 1400 | 300 |
| 16 | 54 Cu.36 Sn.10 Co | 5.35 | 1400 | 660 |
| 17 | 77 Ni.13 Cr.10 P | 5.42 | 1410 | 660 |
| 18 | 64 Cu.18 Ni.18 Zn | 5.3 | 1400 | 300 |
| 19 | 64 Fe.28 Ni.8 Si | 5.39 | 1370 | 300 |
| 20 | 47 Cu.40 Zn.13 Ni | 5.3 | 1400 | 300 |
| 21 | 30 Cu.26 Mn.24 Ni.20 Sn | 5.25 | 1360 | 40 |
| 22 | 45 Cu.30 Fe.25 Co | 5.3 | 1400 | 300 |
| 23 | 55 Cu.25 Co.20 Fe | 5.3 | 1400 | 300 |
| 24 | 49 Cu.32 Co.15 Sn.4 Ag | 5.3 | 1400 | 300 |
| 25 | 55 Cu.25 Co.13 Fe.7 Ni | 5.3 | 1410 | 300 |

EXAMPLES 26 to 32

The invention is illustrated further by Examples 26 to 32 in which examples of the range of source diamond sizes is shown. All source diamond was free of macroscopic facets. These examples also illustrate the need for more extreme conditions of temperature and time, as well as the need to vary the type of solvent/catalyst, in order to practise the invention at coarser source diamond sizes. Faceted diamond crystals were produced. The conditions used in the examples are set out in Table II hereinafter.

TABLE II

| Example | Source diamond size (micron) | Solvent/catalyst Type | Pressure GPa | Temperature (° C.) | Time (mins) |
| --- | --- | --- | --- | --- | --- |
| 26 | 0.3 | Co | 4.8 | 1170 | 660 |
| 27 | 2 | Co—Fe | 5.3 | 1380 | 660 |
| 28 | 8 | Co—Fe | 5.3 | 1380 | 660 |
| 29 | 22 | Co—Fe | 5.3 | 1380 | 660 |
| 30 | 35 | Fe—Ni | 5.1 | 1370 | 60 |
| 31 | 57 | Fe—Ni | 5.3 | 1400 | 660 |
| 32 | 115 | Fe—Ni | 5.3 | 1400 | 660 |

EXAMPLE 33

The particle size distribution of a mass of source diamond particles free of macroscopic facets and with a nominal size range of 30 microns to 45 microns was measured using a laser beam diffraction method. A mixture was made of (a) 25% by volume of these source diamond particles, and (b) 75% by volume iron-nickel powder. The mixture was placed in a reaction capsule and raised to conditions of about 5.3 GPa and about 1360° C. for a period of 18 minutes.

The diamond was recovered from the material by dissolving the solvent/catalyst in a mixture of dilute mineral acids. After washing and drying, the recovered diamond was weighed and the particle size distribution again measured.

Figure 3:
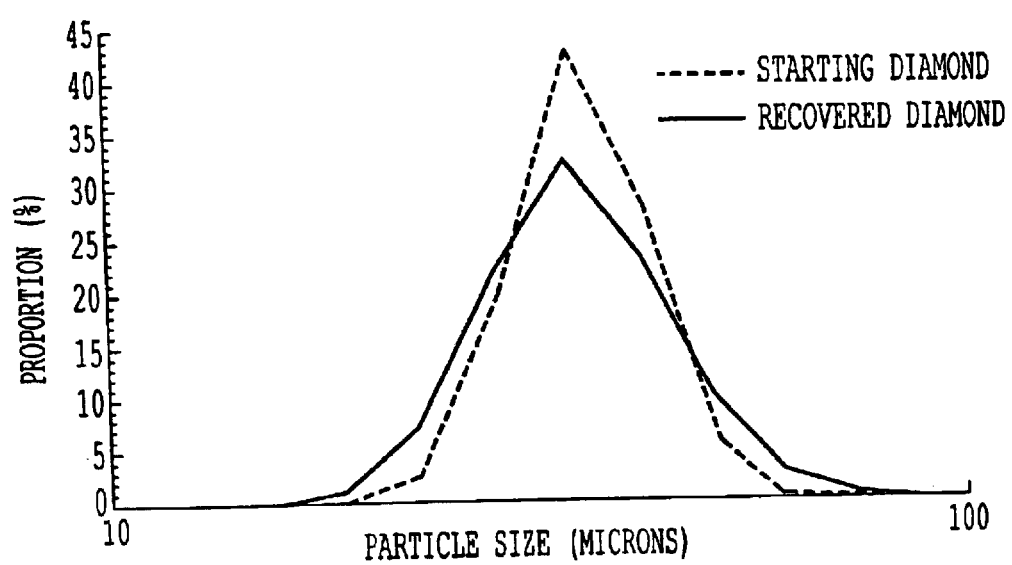
FIG. 3 is a graph comparing the recovered diamond particle size distribution with a starting diamond particle size distribution.

The mass of diamond lost was found to be 24% or 3.5% of the mass of the solvent/catalyst, which is commensurate with the solubility of the diamond in the solvent/catalyst. The particle size distributions of the source diamond particles and the faceted diamond recovered from the reaction capsule are shown in FIG. 3. The size distribution of the source diamond particles and the recovered faceted diamond particles are substantially the same, with the recovered diamonds being slightly larger than the source diamonds, which is also shown by a slight decrease in specific surface area from 0.178 square meters per gram to 0.168 square meters per gram. The slight coarsening of the size distribution is confirmation of the faceting being due to a growth process utilising the Wulff effect rather than a dissolution process.

EXAMPLE 34

A mass of source synthetic diamond particles free of macroscopic facets and with a nominal size range of 24 microns to 48 microns, was coated with a layer of nickel-phosphorus about 2 microns thick. The layer was deposited using an electroless method in such a way that the coated particles were substantially discrete. A mixture comprising (a) 20% by volume of the coated diamond particles, and (b) 80% by volume sodium chloride was made, and this mixture placed in reaction capsule. The reaction capsule was raised to conditions of about 5.2 GPa and about 1310° C. for a period of 300 minutes. The diamond was recovered from the reaction capsule by dissolving the sodium chloride in warm water. Examination of the recovered diamond showed it to be almost entirely faceted.

EXAMPLE 35

A mixture was made of (a) 30% by volume synthetic diamond particles free of macroscopic facets and with a particle size less then 0.5 micron, and (b) 70% by volume cobalt powder. This mixture was placed in a reaction capsule and raised to conditions of about 4.8 GPa and 1170° C., and the conditions maintained for a period of 11 hours. The diamond was recovered from the reaction capsule by dissolving the cobalt in dilute hydrochloric acid, and filtering the diamond from the liquor. Examination of the diamond showed faceted crystals with a size substantially less than 1 micron. According to Muncke (see "The Properties of Diamond" edited by J. E. Field, page 517, Academic Press 1979), the eutectic temperature in the Co-C system at 4.8 GPa is about 1375° C., thus under the conditions imposed in this example, the reaction mixture was in the solid state during the crystal growth period.

Unless otherwise stated, in all the examples described above, the faceted diamond particles were recovered by simply dissolving the catalyst/solvent in a suitable and known acid or solvent leaving a mass of individual, discrete faceted diamond crystals. Where some of the crystals were loosely bound to others, they were liberated by subjecting the bound agglomerates to light milling or similar action.

The faceted diamonds of Examples 5 to 35 were all similar to those illustrated by FIGS. 4 and 5. In all cases there was some twinned diamond crystal, but at least 80% of the particles were single crystal.

What is claimed is:

1. A method of producing a mass of diamond crystals, wherein the diamond crystals of the mass are predominantly macroscopically faceted single crystals, comprising the steps of:

providing a source of diamond crystals which are substantially free of macroscopically faceted surfaces, contacting the source of diamond crystals with a suitable solvent/catalyst, thereby producing a reaction mass, subjecting the reaction mass to conditions of elevated temperature and pressure suitable for crystal growth in the reaction zone of a high temperature/high pressure apparatus, removing the reaction mass from the reaction zone, and recovering the diamond crystals from the reaction mass, wherein the conditions of diamond crystal growth are such that a supersaturation driving force necessary for diamond crystal growth is generated predominantly by the difference in surface free energy between surfaces of the diamond crystals having a low miller index surface and surfaces of the diamond crystals having a high miller index surface, thereby converting the source diamond crystals to diamond crystals having macroscopic facets of low miller index.

2. A method according to claim 1 wherein the mass of diamond crystals comprises at least 80% of macroscopically faceted single crystals.

3. A method according to claim 1 or claim 2 wherein the elevated temperature is in the range of 1100 to 1500° C. and the elevated pressure is in the range of 4.5 to 7 Gpa.

4. The method according to claim 1, wherein the solvent/catalyst is selected from the group consisting of iron, cobalt, nickel, manganese, alloys of iron, alloys of cobalt, alloys of nickel, alloys of manganese, stainless steels, silicon steels, bronzes, nickel/phosphorus brazes, nickel/chromium/phosphorus brazes, nickel/palladium brazes, copper, copper/aluminum, phosphorus, alkaline hydroxides, alkaline earth hydroxides, alkaline carbonates, alkaline earth carbonates, alkaline sulphates, alkaline earth sulphates, alkaline chlorates, alkaline earth chlorates, alkaline silicates, alkaline earth silicates, hydrated forsterite, and hydrated enstatite.

5. The method according to claim 1, wherein said recovering comprises dissolving the solvent/catalyst with a mixture of dilute mineral acids.

* * * * *